Patented Apr. 16, 1935

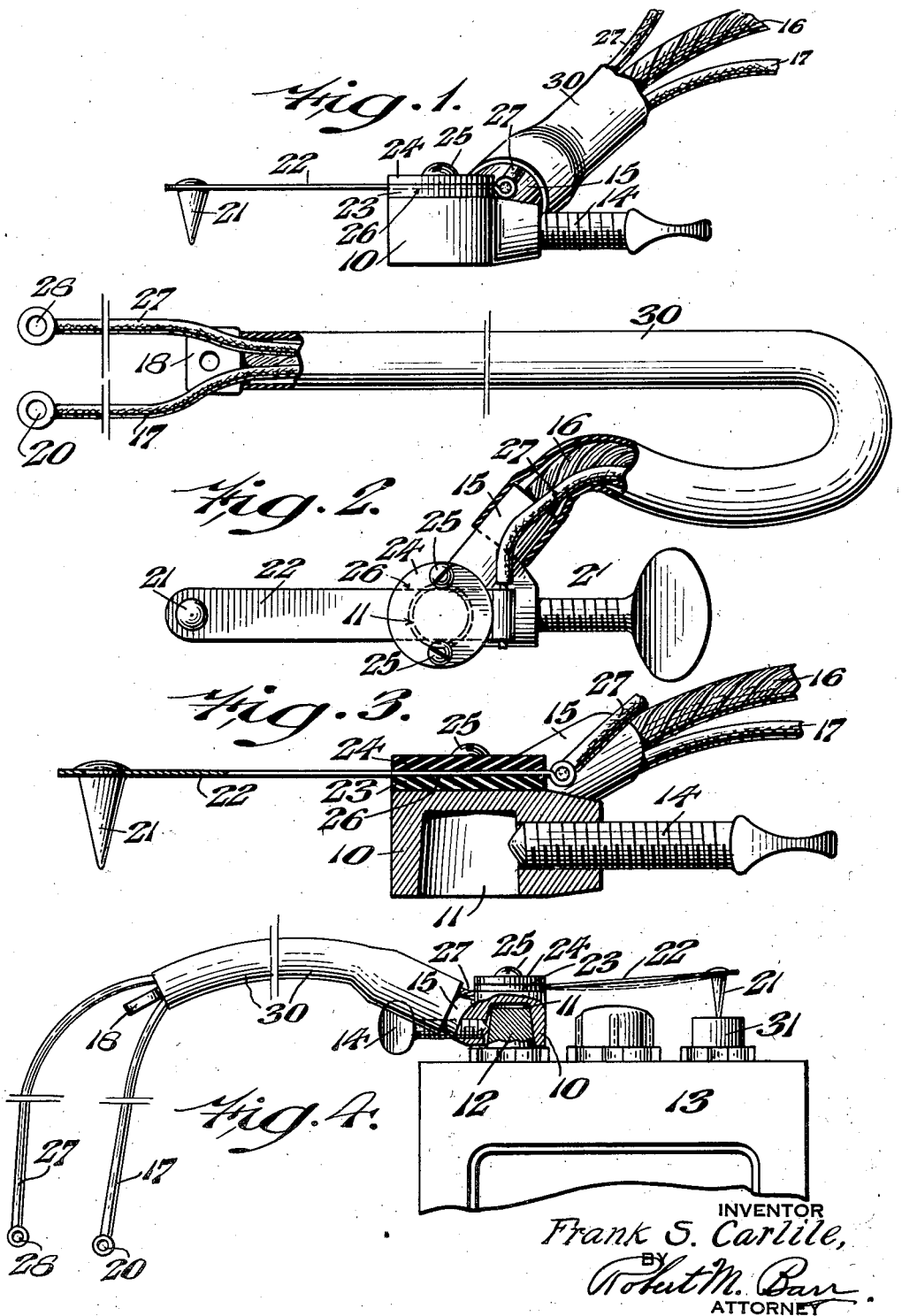

1,997,963

UNITED STATES PATENT OFFICE 1,997,963

TERMINAL ATTACHMENT

Frank S. Carlile, Abington, Pa.

Application March 18, 1933, Serial No. 661,491

7 Claims. (Cl. 173—324)

The present invention relates to storage battery equipment, test instruments, and the like and more particularly to a terminal attachment for connecting a conductor to a battery pole.

In battery testing equipment as heretofore used it has been the practice to provide a conductor with a terminal in the form of a spring clamp, the jaws of which can be distended to receive the terminals of one cell of a battery. Such constructions have been found to be open to many objections and disadvantages, for example in continued use the jaw operating springs become weakened so that good electrical contact is not made and incorrect readings result. Also these snap-on terminals frequently slip off just as a reading is about to be taken and necessitate replacement, and as there are two such terminals to a battery under test the likelihood of disconnection and imperfect contacts is doubled.

Some of the objects of the present invention are to provide a terminal attachment for conductors leading to testing instruments, or conductors used for other purposes, which can be readily attached to and removed from a battery, and when in place rigidly anchor the conductors respectively to the two poles of a battery cell; to provide a terminal wherein provision is made for efficiently joining conductors to the poles of a battery cell to form two substantially perfect electrical contacts; to provide a terminal operating in conjunction with a plurality of electrical conductors so that two or more readings can be simultaneously obtained when the terminal is in operative position; to provide a terminal having a clamping device for attaching it to one terminal pole of a battery and having in association therewith a contact member for engaging the opposite pole of the cell of the battery and including means whereby the contact member increases its pressure upon its battery pole as the terminal is attached increasingly tighter to the battery post; and to provide other improvements as will hereinafter appear.

In the accompanying drawing Fig. 1 represents a side elevation of a battery terminal attachment embodying one form of the present invention; Fig. 2 represents a plan of the same partly broken away and showing also one form of current conducting means; Fig. 3 represents a longitudinal section of the attachment; and Fig. 4 represents an end elevation of a portion of a storage battery showing the attachment and current conducting means in operative position.

Referring to the drawing one form of the present invention consists of a body 10 of suitable material for conducting an electric current having a substantially cylindrical socket opening 11 formed therein of such diameter and length as to receive and fit about a terminal post 12 of a storage battery 13. The wall of the opening 11 is preferably tapered to converge inwardly but the angle of taper is larger than that of the post 12 in order to cause the body 10 to assume a slightly tilted position when attached to a battery. A good electrical contact is made between the body 10 and the post 12 through the medium of a thumb screw 14 which is threaded into the body 10 to enter the socket opening 11 at one side. The contact end of the screw 14 is preferably of convex contour to form a substantially one point bearing against the post 12 so that the desired tilting of the body takes place when the screw is fed to clamping position. This is because the top portion of the wall abuts the post before the lower portion (which is of greater diameter) does. In other words when the body 10 is placed over the terminal post 12 of a battery it has initially a relatively loose fit about the post 12 and the clearance afforded by the larger diameter at the base of the body 10 results in the body 10 tipping as the fastening screw 14 is tightened.

For connecting a conductor or conductors to the body 10, the latter is provided with an integral socket 15 which in this instance receives a flexible wire cable 16 of relatively large diameter and in addition a flexible conductor 17 of relatively small diameter, the two conductors being welded or otherwise burnt into permanent electrical connection with the socket 15. In the present instance the cable 16 terminates in an apertured head 18 so that it can be attached to a supporting post on a testing or other instrument and serve as a substantial suspending means for the body 10 while allowing the desired flexibility for readily bringing the body 10 into operative position. The conductor 17 may be of any suitable length but is preferably such as to bring its free end into proximity to a voltmeter or other testing instrument to which it can be attached by an eyelet 20 of conducting material as will be understood.

In order that the terminal attachment can be used for voltage readings across one cell of the battery a terminal contactor 21 of generally pointed or conical configuration is electrically connected to a metal strip 22 which is supported at one end between two discs 23 and 24, each of insulating material in order to electrically separate the strip 22 from the body 10. The two discs 23 and 24 are made fast to the top of the body 10 by machine screws 25 so that the parts are maintained in proper assembled condition. The thickness of the strip 22 is compensated for in the assembly by providing a receiving groove 26 in the face of one of the discs 23 or 24. In this case it is in the disc 23. The fixed end of the strip 22 is electrically connected to a conductor 27 which has its free end terminating in a terminal eyelet 28 for connecting to the terminal of a voltmeter or other instrument. In connection with the conductors 17 and 27 it should be noted that these are of the type which have the conducting wire covered by rubber insulation, so that there can be no short circuiting between the cable 16 and the conductor 17 to the conductor 27. Also as a protecting means to permit free handling of the attachment without danger of short circuits the conducting cable 16 and both of the conductors 17 and 27 pass through a protecting cover 30 in the form of a flexible rubber tube of such diameter as to enclose all of the conductors.

In assembling the attachment terminal of the present invention the socket 10 is fitted over the terminal post 12 of a battery and so located thereon as to bring the contactor 21 directly over the opposite pole 31 of the end cell of the battery. In this position the feed screw 14 is tightened to rigidly anchor the body 10 to the post 12 in good electrical bonding relation and in so doing the above described limited tilting action takes place which causes the contactor 21 to be urged firmly against the pole 31. Thus practically perfect electrical contacts are made at both the post 12 and the pole 31.

The tilting action heretofore referred to takes place not only because of the clearance afforded by the tapered construction described but also because a fulcrum point is formed on the pole in spaced relation with respect to the point of engagement of the clamping device and therefore when the latter is tightened the entire terminal mounting turns about this fulcrum point to bring the insulated conductor or contact against the opposite pole of the cell with the necessary pressure for a good electric contact.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A terminal attachment for batteries comprising a body provided with a socket opening for receiving one pole of a battery cell, said socket having a taper to provide a clearance between said body and said pole to permit said body to tilt outward and away from the opposite pole of said cell, a conducting strip extending laterally from said body, means for connecting and insulating said strip from said body, a contactor carried by said strip and located to engage the opposite pole of said cell when said body is in operative position, conductors leading respectively from said strip and from said body, and a clamping means extending through said body to engage the enclosed battery pole whereby said body is clamped to said pole and said contactor is pressed against the opposite battery pole.

2. A terminal attachment for batteries comprising a conducting body for engaging one pole of a battery cell, said body being shaped to oscillate on said pole as a support, a conductor mounted on and insulated from said body for engaging the opposite pole of said cell, when said body moves in one direction, a device for clamping said body to the supporting pole, and means at the opposite side of said body from said clamping device forming a fulcrum for said body whereby tightening of said clamping device tilts said body to cause said conductor to contact with said opposite pole.

3. A terminal attachment for batteries comprising a body having a socket of a size to fit loosely over one terminal of a battery cell for motion relative thereto, a contactor mounted on said body in position to engage the second terminal of said cell when said body is tilted upon said first terminal, means for insulating said contactor from said body, conductors respectively connected to said body and to said contactor, and means including a clamp coacting with said first terminal for tilting said body to press said contactor against said second terminal.

4. A terminal attachment for batteries comprising a contactor for engaging one terminal of a battery cell, means including a body mounted on the second terminal of said cell for supporting said contactor for tilting movement towards and away from said first terminal, means for tilting said supporting means to move said contactor into engagement with said second terminal conductors respectively connected to said body and said contactor, and means for insulating said conductors from each other.

5. A testing device for batteries comprising a body arranged to be mounted on one terminal of a battery cell, said body having a socket tapered with respect to said terminal to permit said body to rock towards and away from the second terminal of said cell, a contactor for engaging said second terminal, an arm carrying said contactor, said arm being mounted on said body and having a length to position said contactor above said second terminal, conductors respectively connected to said body and said contactor, means for insulating said contactor from said body, and a clamping screw passing through said body to engage the body terminal to rock said body to bring said contactor into engagement with said second terminal.

6. A testing device for batteries comprising a conducting body having sides for straddling a terminal of a battery, one of said sides having a fulcrum point contacting said terminal, a clamping means coacting with said body to engage said terminal out of horizontal alinement with said fulcrum point to cause said body to tilt on said terminal, a contactor mounted on said body in alinement with the second terminal of said cell, said contactor being out of positive contact with said second terminal when said clamping means is released from said first terminal and in engagement with said second terminal when said clamping means is tightened against said first terminal, means for insulating said contactor from said body, and conductors respectively connected to said body and contactor.

7. A testing device for batteries having a plurality of terminals, contact means having a first portion arranged to engage a face of a terminal near an end thereof, said means having a second portion arranged to engage an opposite face of the said terminal at a point spaced from said end, means for securing relative movement of the two said portions so as to grip said terminal and simultaneously develop a turning movement of said contact means on said terminal, and means operatively associated with said contact means and responsive to said moment for electrically engaging another of said terminals.

FRANK S. CARLILE.